United States Patent [19]

Yoshimura et al.

[11] Patent Number: 4,823,646
[45] Date of Patent: Apr. 25, 1989

[54] APPARATUS FOR CONTROLLING AUTOMATIC GEAR TRANSMISSION

[75] Inventors: Hiroshi Yoshimura, Yokohama; Youichi Iida, Numadu, both of Japan

[73] Assignee: Isuzu Motors Limited, Kawasaki, Japan

[21] Appl. No.: 26,974

[22] Filed: Mar. 17, 1987

[30] Foreign Application Priority Data

Mar. 17, 1986 [JP] Japan .................................. 61-59013
Mar. 17, 1986 [JP] Japan .................................. 61-59014

[51] Int. Cl.$^4$ .............................................. B60K 41/06
[52] U.S. Cl. .................................................... 74/866
[58] Field of Search .......................... 74/862, 866, 877; 364/424.1

[56] References Cited

U.S. PATENT DOCUMENTS

| 3,713,351 | 1/1973 | Sakakibara et al. ................... 74/645 |
| 4,282,780 | 8/1981 | Totani et al. ...................... 74/866 X |
| 4,285,252 | 8/1981 | Yamaki et al. ..................... 74/862 X |
| 4,312,249 | 1/1982 | Hau et al. ............................... 74/866 |
| 4,335,428 | 6/1982 | Miki et al. ......................... 74/866 X |
| 4,338,666 | 7/1982 | Suzuki et al. ...................... 74/866 X |
| 4,361,060 | 11/1982 | Smyth ................................... 74/866 |
| 4,421,192 | 12/1983 | Ito et al. ............................. 74/866 |
| 4,517,646 | 5/1985 | Magnusson et al. ............. 74/866 X |
| 4,523,496 | 6/1985 | Fukunaga .............................. 74/866 |
| 4,548,079 | 10/1985 | Klatt ............................ 364/424.1 X |
| 4,564,906 | 1/1986 | Stephan et al. .................... 74/877 X |
| 4,569,255 | 2/1986 | Holmes ................................. 74/866 |
| 4,599,917 | 7/1986 | Léorat et al. ........................ 74/866 |
| 4,599,918 | 7/1986 | Stelter et al. ........................ 74/866 |
| 4,630,508 | 12/1986 | Klatt ..................................... 74/866 |
| 4,648,291 | 3/1987 | Klatt et al. ........................... 74/866 |

FOREIGN PATENT DOCUMENTS

| 0108572 | 10/1983 | European Pat. Off. . |
| 0142046 | 10/1983 | European Pat. Off. . |
| 203256 | 11/1983 | Japan ............................... 364/424.1 |
| 1322579 | 10/1970 | United Kingdom . |
| 2030661A | 6/1979 | United Kingdom . |

Primary Examiner—Dwight G. Diehl
Attorney, Agent, or Firm—Staas & Halsey

[57] ABSTRACT

An apparatus for controlling an automatic gear transmission and for modifying an optimum gear position based on the engine output and the running resistance for the optimum gear position. If the optimum gear position is a shift-up from the present gear position, the shift-up to the optimum gear position is inhibited when the running resistance is larger than the engine output. If the optimum gear position is the present gear position, the gear transmission is shifted down when the running resistance is larger than the engine output for the present gear position.

7 Claims, 5 Drawing Sheets

RUNNING PERFORMANCE GRAPH

RUNNING PERFORMANCE GRAPH

APPARATUS FOR CONTROLLING AUTOMATIC GEAR TRANSMISSION

BACKGROUND OF THE INVENTION

The present invention relates to an apparatus for controlling an automatic gear transmission for a motor vehicle.

The logic for controlling a conventional electronically controlled automatic gear transmission is based on a shift schedule determined from vehicle speeds and the amount of a throttle value opening (hereinafter referred to as the amount of accelerator opening) shows, by way of example, a shift scheduled map of a shift-up schedule indicated by the solid lines and a shift-down schedule indicated by the dotted lines.

The motor vehicle can stably run on a flat road or a road with a relatively uniform gradient by controlling selection of gear changes based on the above shift schedule.

When the motor vehicle runs on a road with its a non-uniform gradient uniform, i.e., varying frequently, e.g., when the motor vehicle runs uphill as illustrated in FIG. 7, the gear transmission must be repeatedly shifted up and down. A large-size motor vehicle, in particular, may not be driven uphill with the gears in the D range (automatic gear shifting range).

More specifically, with a conventional shift schedule arranged by an ordinary logic, when a running condition varies (for example, the amount of depression of the accelerator pedal is reduced or the vehicle speed is increased), the gear transmission is shifted up based on the shift map even if the engine output is not sufficient in the gear position to which the transmission is shifted up. Since the engine output is insufficient in the selected gear position, the vehicle speed is lowered and hence the gear transmission is shifted down. Thus, the gear transmission is repeatedly and unnecessarily shifted up and down.

According to the shift schedule based on the shift map shown in FIG. 6, the gear transmission is not shifted down unless the vehicle speed is reduced. This transmission control tends to irritate the driver, to increase the time required to go uphill, and fails to utilize the engine power fully. This results in a reduction in the power performance of the engine.

One solution which has been employed has been to provide a manual gear range separately, and allow the driver to select an optimum gear position. This arrangement is however problematic in that the required gear changing operation is cumbersome and the merits of the automatic gear transmission are lost.

SUMMARY OF THE INVENTION

It is an object of the present invention to provide an apparatus for controlling an automatic gear transmission capable of automatically selecting an optimum gear position according to the engine output corresponding, the resistance to running of a motor vehicle so as to prevent meaningless gear shift-ups.

Another object of the present invention is to provide an apparatus for controlling an automatic gear transmission capable of automatically selecting an optimum gear position according to the running of a motor vehicle without waiting for a reduction in the speed of travel of the motor vehicle.

According to the present invention, there is provided an apparatus for controlling an automatic gear transmission by commanding an optimum gear position thereof based on the speed of travel of a motor vehicle and the amount of accelerator opening thereof, comprising arithmetic means for computing an engine output for the optimum gear position, arithmetic means for computing the engine output corresponding to the running resistance of the motor vehicle for the optimum gear position, comparison means for comparing the engine output and the running resistance which have been computed by the arithmetic means, and command modifying means for modifying the optimum gear position based on the result of comparison effected by the comparison means.

According to the present invention, there is also provided an apparatus for controlling an automatic gear transmission by commanding an optimum gear position thereof based on the speed of travel of a motor vehicle and the amount of accelerator opening thereof, comprising arithmetic means for computing an engine output for the optimum gear position if the optimum gear position is a shift-up from the present gear position, arithmetic means for computing the engine output corresponding to the running resistance of the motor vehicle for the optimum gear position, comparison means for comparing the engine output and the running resistance which have been computed by both of the arithmetic means, and command modifying means for inhibiting a shift-up to the optimum gear position when the running resistance is larger than the engine output based on the result of comparison effected by the comparison means.

According to the present invention, there is further provided an apparatus for controlling an automatic gear transmission by commanding an optimum gear position thereof based on the speed of travel of a motor vehicle and the amount of accelerator opening thereof, comprising arithmetic means for computing an engine output for the present gear position if the optimum gear position is the present gear position, arithmetic means for computing the engine output corresponding to the running resistance of the motor vehicle for the present gear position, comparison means for comparing the engine output and the running resistance which have been computed by the arithmetic means, and command modifying means for modifying the optimum gear position into a lower gear position and commanding a shift-down when the running resistance is larger than the engine output based on the result of comparison effected by the comparison means.

The above and other objects, features and advantages of the present invention will become more apparent from the following description when taken in conjunction with the accompanying drawings in which preferred embodiments of the present invention are shown by way of illustration only.

DETAIL DESCRIPTION OF THE PREFERRED EMBODIMENTS

Figure 1:
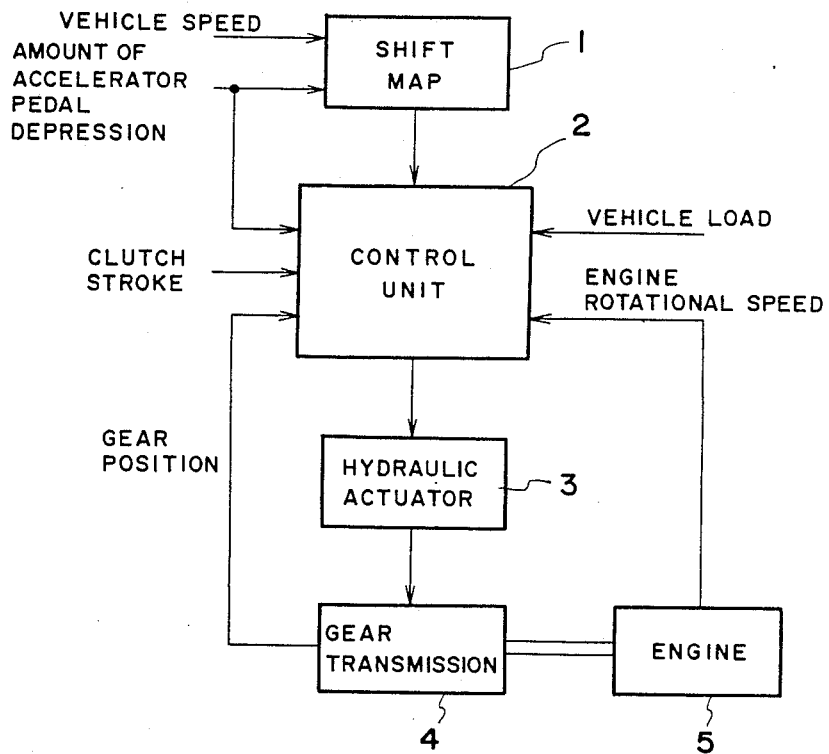
FIG. 1 is a block diagram of an apparatus for controlling an automatic gear transmission according to an embodiment of the present invention.

As shown in FIG. 1, an apparatus for controlling an automatic gear transmission according to an embodiment of the present invention includes a shift map 1 which is used to determine an optimum gear position based on a motor vehicle speed and an amount of accelerator opening. A command signal from the shift map 1 is applied to a control unit 2. The control unit 2 is responsive to the command signal from the shift map 1 and applies a transmission control command signal to a hydraulic actuator 3 which controls, for example, the operation of a gear transmission 4, The control unit also applies a control signal to a clutch actuator which operates a clutch (not shown). The control unit 2 includes an arithmetic circuit for computing an engine output of an engine 5 at a gear position determined by the shift map 1. The control unit performs this calculation using an equation described below. The control unit 2 is supplied with a signal indicative of the rotational speed of the engine 5, a gear position signal, a clutch stroke signal, and other signals. The control unit 2 also includes an arithmetic circuit for computing the resistance to running of the motor vehicle (running resistance) from a vehicle load signal applied thereto; a comparator for comparing the engine output and the running resistance; and another comparator for determining whether the accelerator opening signal is higher than a prescribed value.

Figure 2:
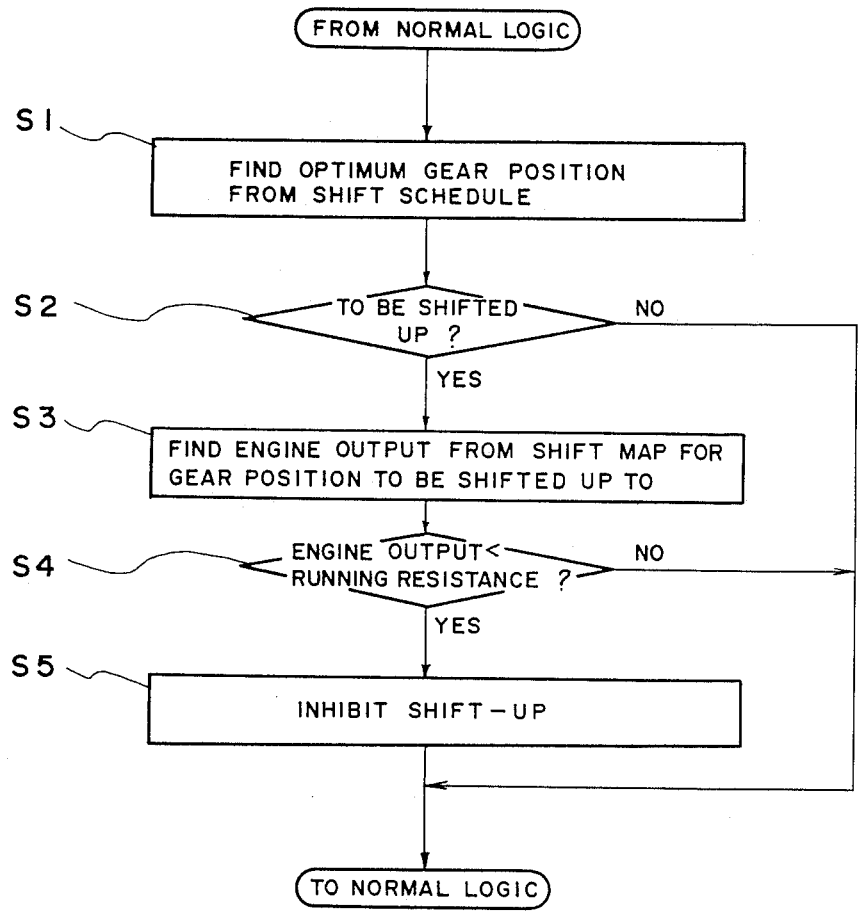
FIG. 2 is a flowchart for the controlling the apparatus shown in FIG. 1.

FIG. 2 is a flowchart of transmission control logic for the control unit 2.

First, control passes from normal logic to a determination of an optimum gear position in a step S1. This determenation is based on a shift schedule, vehicle speed and an amount of accelerator opening.

Then, the processing of step S2 ascertains whether the gear position requires a shift-up from the present gear position. If "NO", then the present gear position selected by the normal logic is maintained. If "YES", then an engine output for the gear position to be shifted up to is found in a step S3 using data representing a shift map stored in a memory included in the control unit 2. The engine output and the running resistance are compared in a step S4. If the engine output is larger than the running resistance, then the transmission is shifted up to the gear position to be reached according to the normal logic. If the engine output for the gear position to be shifted up to is smaller than the running resistance, then the shift-up is inhibited in a step S5, and the present gear position selected according to the normal logic is maintained.

The running resistance is computed by the following equation:

$$Pmer = Pme - A \times \frac{W}{Vs} \times \left(\frac{R}{\mu f}\right)^2 \times \left(\frac{1}{\mu Ti}\right)^2 \times \frac{\Delta Ne}{\Delta t}$$

where

Pmer: the engine output corresponding to the running resistance,
Pme: the engine output,
A: a constant,
Vs: the total displacement of the engine,
W: the weight of the vehicle,
$\mu f$: the final ratio,
R: the radius of the tires,
$\mu ti$: the transmission gear ratio,
$\Delta Ne/\Delta t$: the change in the engine rotational speed in a time $\Delta t$.

Figure 3:
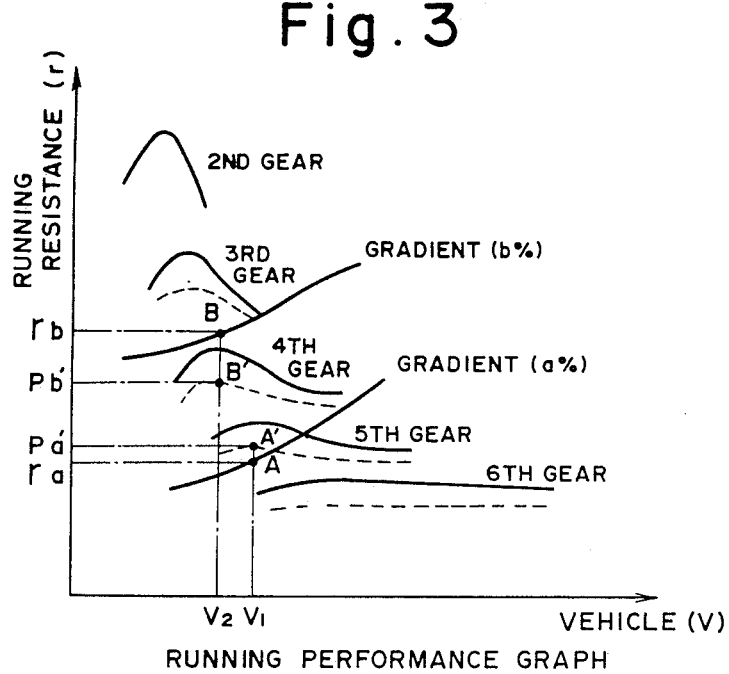
FIG. 3 is a graph for transmission control logic according to an embodiment of the invention.

Determination and correction of the gear shift-up according to the present embodiment will be described in more detail based on the running performance graph of FIG. 3.

The engine output corresponding to the running resistance when a motor vehicle runs at a speed V1 on a road having a gradient a% (point A) is ra, and it is assumed that the motor vehicle is running under this condition with the gear transmission in the 4th gear position selected by the normal logic. When the amount of accelerator opening is reduced while the motor vehicle is running at the speed V1 or the vehicle speed is increased from $V_1$ without changing the accelerator opening determination as to whether the motor vehicle should run with the 4th gear position or the gear transmission shifted up to allow the motor vehicle to run with the 5th gear position is carried out by comparing a maximum engine output Pa' (which is of a value obtained by subtracting a marginal engine output from an actual maximum engine output) for the 5th gear position to be shifted up to with the running resistance ra. Since Pa' > ra in this case, it is possible for the motor vehicle to run at the speed V1 even when the gear transmission is shifted up to the 5th speed. The time required for the motor vehicle to run uphill is reduced by selecting the 5th gear position. Therefore, the gear transmission is shifted up to the 5th gear position.

The running resistance when the motor vehicle runs at a speed V2 on a road having a gradient b% (point B) is rb, and it is assumed that the motor vehicle is running under this condition with the gear transmission in the 3rd gear position selected by the normal logic. Determination as to whether the motor vehicle should run with the 3rd gear position or the gear transmission shifted up to 4th gear position is carried out by comparing a maximum engine output Pb' for the 4th gear position with the running resistance rb. Since Pb' < rb in this case, the shift-up is inhibited, and the gear transmission remains in the 3rd gear position.

With the present embodiment, as described above, when an optimum gear position determined on the basis of the running speed of the motor vehicle and the amount of accelerator opening is a shift-up from the present gear position, the engine output for the optimum gear position and the running resistance are compared. If the running resistance is larger than the engine output, then the shift-up is inhibited. Only if the engine output is larger than the running resistance, is the gear transmission shifted up to the optimum gear position. Since the conventional meaningless gear shifting operation in which the gear transmission is repeatedly shifted up and down according to the normal logic while the motor vehicle is running uphill is eliminated, the running performance of the motor vehicle is improved, and the time required for the motor vehicle to move up a slope is reduced by selecting an optimum gear position while still taking advantage of the automatic gear transmission.

Figure 4:
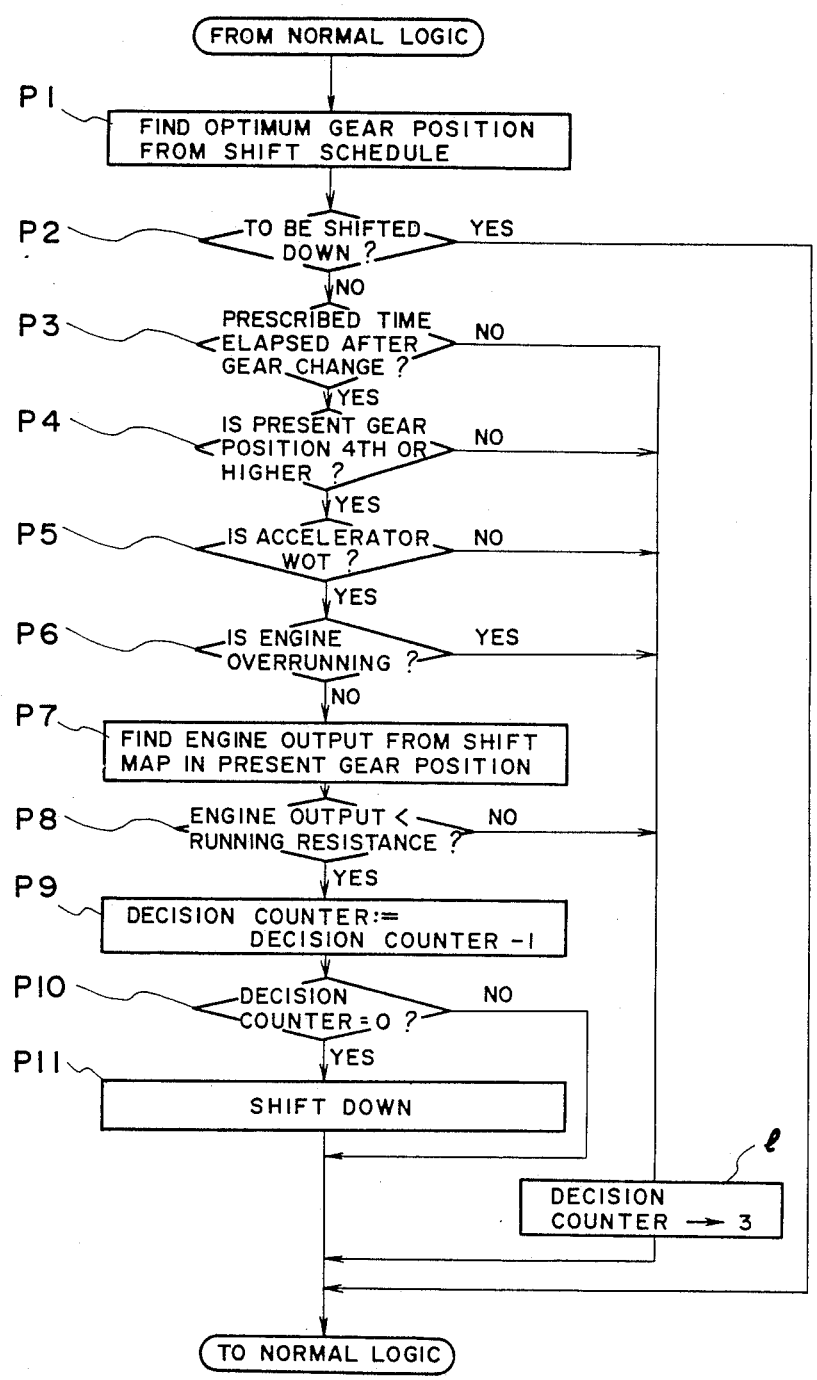
FIG. 4 is a flowchart of transmission control according to another embodiment of the present invention.
Figure 6:
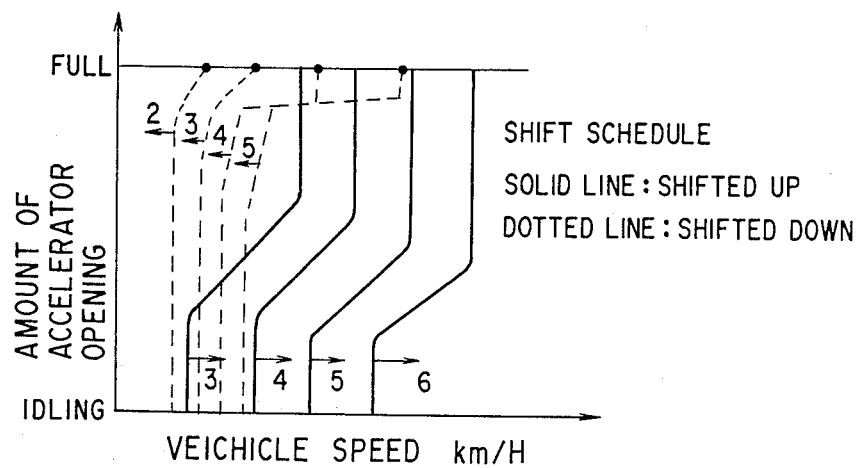
FIG. 6 is a diagram illustrating a shift schedule map.
Figure 7:
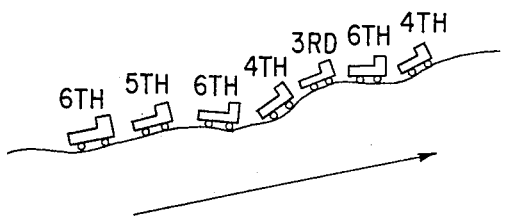
FIG. 7 is a diagram showing the manner in which a motor vehicle runs on a road with non-uniform gradient.

FIG. 4 is a flowchart of another embodiment of a transmission control logic for the control unit 2.

An optimum gear position is found in a step P1 using a shift schedule that is determined by the vehicle speed and the amount of accelerator opening. Then, a step P2 checks if the optimum gear position is a shift-down from the present gear position. If "YES", i.e., if the optimum gear position is a shift-down, then the gear transmission is shifted down to the optimum gear position according to the normal logic. This is the first case for effecting a gear shift-down with the transmission control apparatus of the present invention.

If the optimum gear position determined from the shift schedule according to the normal logic is not a shift-down from the present gear position, i.e., if the optimum gear position is the present gear position, then the following conditions are checked:

(i) Whether or not a prescribed time has elapsed after a gear change (step P3)? This checking is needed since no accurate running resistance could be computed because the clutch is disconnected during gear change.

(ii) Whether or not the present gear position is the 4th gear position or higher (step P4)? This checking is needed since a shift-down from the 3rd gear position to the 2nd gear position is not necessary.

(iii) Whether or not the accelerator or throttle valve is in the fully open position (WOT) (step P5)? This checking is effected since no shift-down is required if a sufficient driving force is available. If the answers to all of the above conditions (i) through (iii) are "YES", then, (iv) whether or not the engine overruns when the gear transmission is shifted down is ascertained (step P6). If the engine does not overrun, then an optimum engine output for the present gear position is determined in a step S7 using data representing a shift map stored in a memory included in the control unit 2.

(v) Then, whether or not the running resistance for the present gear position is larger than the determined maximum engine output is checked in a step P8. For this checking step, variations in the values of the computed running resistance are eliminated by setting a decision counter to "3", and confirming whether the running resistance is larger than the maximum engine output in three successive checking cycles (steps P9 and P10). More specifically, in the first checking cycle, "1" is subtracted from the first setting "3" to obtain "2" which is held in the decision counter. Since "2" is not "0", control returns to the normal logic to repeat the above sequence of checking steps (i) through (iv). If the answers to the steps (i) through (iii) are "YES" and the answer to the step (IV) is "NO", then control enters the second checking cycle in which "1" is subtracted from "2" held in the decision counter to obtain "1" which is then held in the decision counter. Since "1" is not "0", control returns to the normal logic to repeat the above sequence of checking steps (i) through (iv). If the answers to the steps (i) through (iii) are "YES" and the answer to the step (IV) is "NO", then control enters the third checking cycle in which "1" is subtracted from "1" held in the decision counter to obtain "0". Therefore, the gear transmission is shifted down. As is apparent from the foregoing, the condition (v) is checked three times, and the gear transmission is shifted down in a step P11 only when the running resistance for the present gear position is larger than the engine output in the three successive checking cycles. This is the second case for a shift-down effected by the transmission control apparatus of the present invention.

The running resistance is computed by the equation described above with respect to the previous embodiment.

Consequently, when the answer any of the steps (i) through (iii) is "NO", or when the answer to the step (iv) is "YES", even if the answers to all of the steps (i) through (iii) are "YES", the gear transmission is not shifted down, and the value of the decision counter is reset to "3". Then, control returns to the normal logic, and the above checking cycles are repeated in the aforesaid manner.

Figure 5:
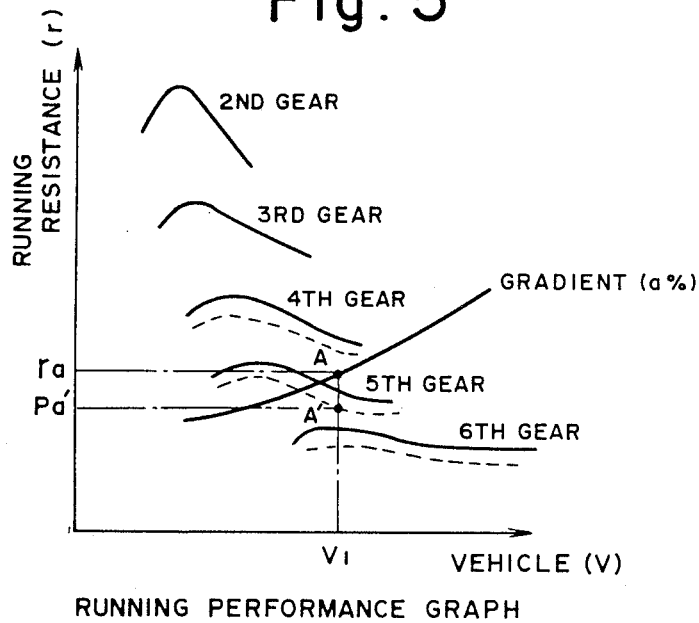
FIG. 5 is a graph for transmission control logic according to another embodiment of the invention.

Determination and correction of the shift-down according to the present invention will be described in greater detail based on the running performance diagram of FIG. 5.

The running resistance when the motor vehicle runs at a speed V1 on a road having a gradient a% (point A) is ra, and it is assumed that the motor vehicle is running under this condition with the gear transmission in the 5th gear position selected by the normal logic. A maximum engine output Pa' under this running condition (which is a value obtained by subtracting a marginal engine output from an actual maximum engine output) for the 5th gear position is determined and compared with the running resistance ra. Since ra> Pa ' in this case, the engine does not overrun even if the gear transmission is shifted down, and the motor vehicle can run at the speed V1. Thus the gear transmission is shifted down also because the time required for the motor vehicle to run uphill is reduced.

According to this embodiment, the gear transmission is shifted down only when (1) a shift-down command is given by the normal logic based on a shift schedule determined by the vehicle speed and the amount of accelerator opening, or (2) if no shift-down command is given by the normal logic, a shift-down is effected in accordance with the running resistance the following conditions:

(i) A prescribed period of time has elapsed after a gear change;

(ii) The present gear position is the 4th gear position or higher;

(iii) The accelerator or throttle valve is in the fully open position (WOT);

(iv) The engine should not overrun when the gear transmission is shifted down; and (v) It is determined, on the basis of comparison between the engine output and the running resistance for the present gear position, that the running resistance is larger than the engine output for three successive cycles.

It will be understood that the present invention is not limited to the above embodiments, and the above conditions may be modified in various ways.

As described above, the embodiments of the present invention are not only such that an optimum gear position is simply selected from a shift schedule based on the vehicle speed and the amount of accelerator opening, but are arranged such that even if a gear shift-down is not determined, the gear transmission is shifted down when the running resistance is larger than the engine output for the present gear position. Therefore, the gear transmission can be shifted at an optimum time for better vehicle running performance. Further, the time required for the motor vehicle to run uphill can be reduced by selecting an optimum gear position while still taking advantage of an automatic gear transmission.

Although certain preferred embodiments have been shown and described, it should be understood that many changes and modifications may be made therein without departing from the scope of the appended claims.

We claim:

1. An apparatus for controlling an automatic gear transmission of a motor vehicle having an engine with an output and being subjected to a running resistance, the automatic gear transmission having a present gear position said apparatus comprising:

arithmetic means, operatively connected to receive an optimum gear position, for computing a maximum output of the engine for the present gear position if the optimum gear position is the present gear position;

arithmetic means, operatively connected to receive an optimum gear position, for computing an engine output corresponding to the running resistance of the motor vehicle for the present gear position;

comparison means for comparing the computed maximum output of the engine and the computed engine output; and command modifying means for modifying the optimum gear position to a lower gear position and commanding a shift-down when the computed engine output corresponding to running resistance is larger than the computed maximum engine output based on the result of comparison effected by said comparison means.

2. An apparatus according to claim 1, wherein said command modifying means includes means for modifying the optimum gear position to a gear position which is one gear position lower than the optimum gear position.

3. An apparatus according to claim 1, further including means for ascertaining whether a prescribed time has elapsed after a gear shift to the present gear position when said optimum gear position is the present gear position.

4. An apparatus according to claim 1, further including means for ascertaining whether the present gear position is a gear position higher than a predetermined gear position when said optimum gear position is the present gear position.

5. An apparatus according to claim 1 wherein the motor vehicle has an accelerator pedal and said apparatus, further includes means for determining an amount of the accelerator opening; and means for ascertaining whether the amount of accelerator opening is of a fully open position when the optimum gear position is the present gear position.

6. An apparatus according to claim 1, further including means for ascertaining whether the engine overruns when the gear transmission is shifted down to a prescribed gear position when said optimum gear position is the present gear position.

7. An apparatus according to claim 1, further including:

decision counter means for counting occurrences of the computed engine output corresponding to running resistance being larger than the computed maximum engine output for the present gear position; and means for ascertaining whether the count of said decision counter means has reached a predetermined number.

* * * * *

UNITED STATES PATENT AND TRADEMARK OFFICE
CERTIFICATE OF CORRECTION

PATENT NO. : 4,823,646
DATED : April 25, 1989
INVENTOR(S) : Hiroshi Yoshimura

It is certified that error appears in the above-identified patent and that said Letters Patent is hereby corrected as shown below:

ON THE TITLE PAGE, ITEM [73],

"Isuzu Motors Limited" to --Isuzu Motors Limited and Fujitsu Limited--.

Signed and Sealed this

Nineteenth Day of December, 1989

Attest:

JEFFREY M. SAMUELS

*Attesting Officer*  *Acting Commissioner of Patents and Trademarks*